United States Patent [19]
Shimizu et al.

[11] Patent Number: 5,765,187
[45] Date of Patent: Jun. 9, 1998

[54] CONTROL SYSTEM FOR A RING BUFFER WHICH PREVENTS OVERRUNNING AND UNDERRUNNING

[75] Inventors: Toshiyuki Shimizu; Takeshi Horie, both of Kawasaki; Hiroaki Ishihata, Kanagawa, all of Japan

[73] Assignee: Fujitsu Limited, Kawasaki, Japan

[21] Appl. No.: 844,852

[22] Filed: Apr. 22, 1997

Related U.S. Application Data

[63] Continuation of Ser. No. 386,135, Feb. 6, 1995, abandoned, which is a continuation of Ser. No. 859,337, Mar. 27, 1992, abandoned.

[30] Foreign Application Priority Data

Apr. 5, 1991 [JP] Japan .................... 3-073146

[51] Int. Cl.⁶ .................................................. G06F 13/00
[52] U.S. Cl. ............................................ 711/110; 395/842
[58] Field of Search .................................. 711/110, 113, 711/157, 167; 395/842, 846, 848

[56] References Cited

U.S. PATENT DOCUMENTS

| | | | |
|---|---|---|---|
| 3,924,245 | 12/1975 | Eaton et al. | 395/425 |
| 4,175,287 | 11/1979 | Fuhrman | 395/411 |
| 4,648,033 | 3/1987 | Lewis et al. | 395/400 |
| 4,692,894 | 9/1987 | Bemis | 395/250 |
| 4,704,697 | 11/1987 | Kiremidjian et al. | 395/153 |

(List continued on next page.)

FOREIGN PATENT DOCUMENTS

| | | |
|---|---|---|
| 0090575 | 10/1983 | European Pat. Off. . |
| 27 14 106 | 10/1978 | Germany . |
| 2714106 | 10/1978 | Germany . |
| 59-112327 | of 1984 | Japan . |
| 112327 | 3/1984 | Japan . |
| 60-178570 | of 1985 | Japan . |
| 178570 | 5/1985 | Japan . |
| 62-184560 | 8/1987 | Japan . |
| 62-184561 | 8/1987 | Japan . |
| 1-295352 | 11/1989 | Japan . |
| 2-23439 | 1/1990 | Japan . |
| 2-73590 | 3/1990 | Japan . |
| 2-173846 | 7/1990 | Japan . |
| 3-37870 | 2/1991 | Japan . |
| 2190220 | 11/1987 | United Kingdom . |

OTHER PUBLICATIONS

Femling, Electronic Design, "Rubber–band Memory Acts as Adjustable Scratchpad", vol. 19, No. 13, 24 Jun. 1971, p. 66, col. 2, line 6—p. 67, col. 2, line 46, Figs.2 and 3.

N.H. MacLean, Jr., IBM Technical Disclosure Bulletin, "Buffer Memory Addressing", vol. 24, No. 1A, Jun. 1981, pp. 213–215.

Roger Whitcomb, Electronic Design, "On–chip Memory Management Comes to 8–bit µP", vol. 30, No. 21, Oct. 1982, pp. 163–171.

D.G. Whitehead, I. Mitchell and P.V. Mellor, Journal of Physics E, Scientific Instruments, "A Low–resolution Vision Sensor", vol. 17, No. 8, Aug. 1984, pp. 653–656.

Richard A. Quinnell, EDN Electrical Design News, "Cache Controller for 80386–based Systems Handles Cache Exceptions Internally", Vo. 34, No. 21, 12 Oct. 1989, p. 96.

*Primary Examiner*—David C. Robertson
*Attorney, Agent, or Firm*—Staas & Halsey

[57] ABSTRACT

A receiving buffer control system comprises a memory having a buffer area serving as a receiving buffer, data being applied to the memory via a bus, a write pointer indicating a write address of the buffer area, and a read pointer indicating a read address of the buffer area. An overrun/underrun detection circuit detects a situation in which an overrun or an underrun will occur in the buffer area in response to the write address indicated by the write pointer and the read address indicated by the read pointer. A control part disables the data from being written into and read out from the buffer area when the overrun/underrun detection circuit detects the situation.

17 Claims, 12 Drawing Sheets

U.S. PATENT DOCUMENTS

| | | | |
|---|---|---|---|
| 4,839,791 | 6/1989 | Ito | 395/250 |
| 4,887,267 | 12/1989 | Kanuma | 371/22.3 |
| 4,945,548 | 7/1990 | Iannarone et al. | 375/4 |
| 4,949,301 | 8/1990 | Joshi et al. | 395/425 |
| 4,980,816 | 12/1990 | Fukuzawa et al. | 395/417 |
| 4,995,041 | 2/1991 | Hetherington et al. | 371/40.1 |
| 5,099,464 | 3/1992 | Maeda | 369/13 |
| 5,133,062 | 7/1992 | Joshi et al. | 395/500 |

FIG. 6
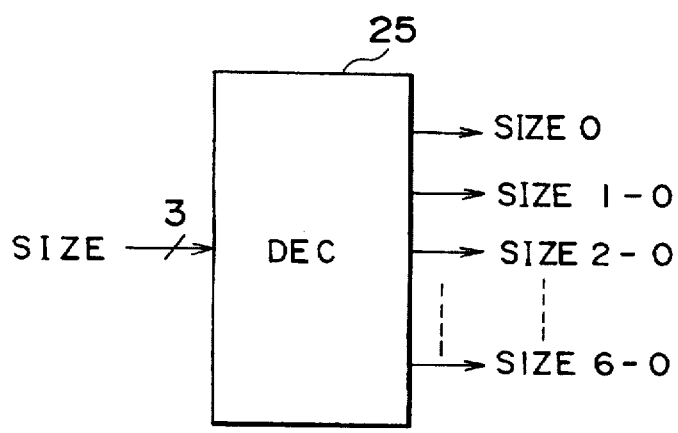
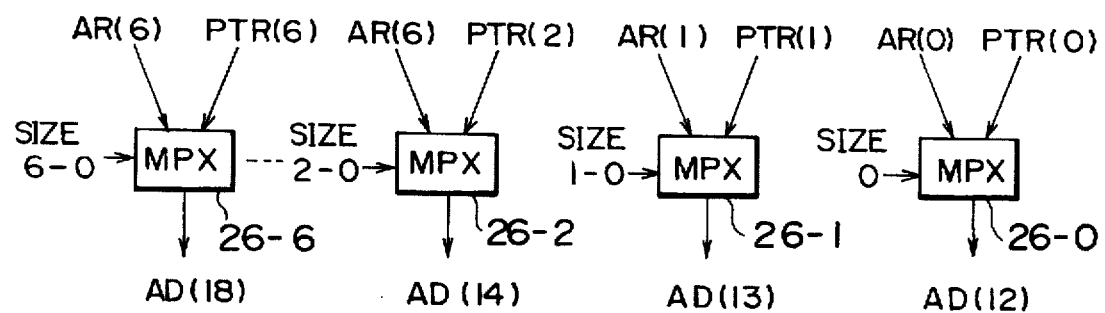

FIG. 14
(a)
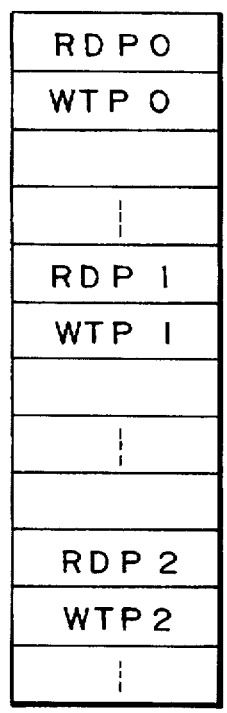
(b)
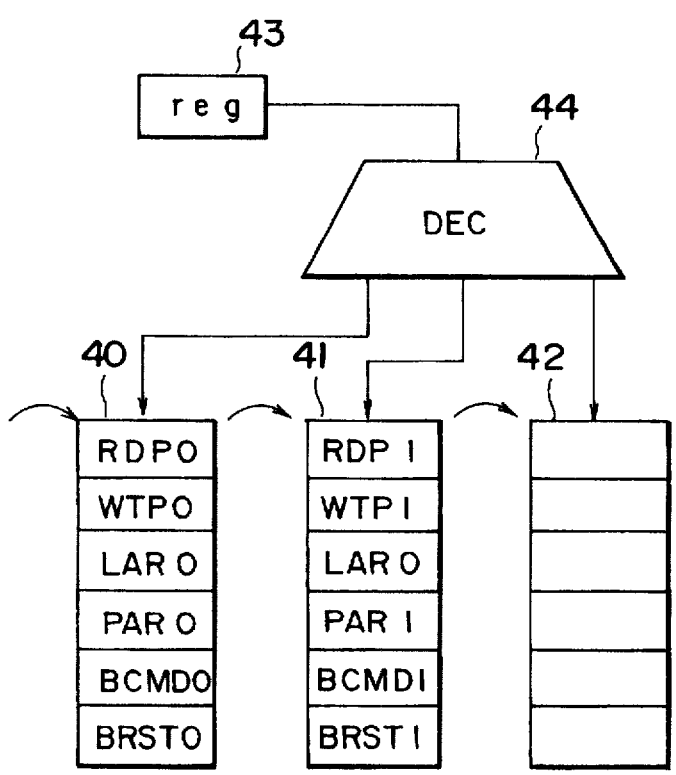

000

CONTROL SYSTEM FOR A RING BUFFER WHICH PREVENTS OVERRUNNING AND UNDERRUNNING

This application is a continuation of application Ser. No. 08/386,135, filed Feb. 6, 1995, which is a continuation of Ser. No. 07/859,337, filed Mar. 27, 1992, both now abandoned.

BACKGROUND OF THE INVENTION (1) Field of the Invention

The present invention generally relates to a receiving buffer which receives data in a message communication, and more particularly to a system for controlling such a receiving buffer.

In a parallel computer system in which a plurality of processors are connected to each other via a network, each of the processors separately holds data. When a processor needs to use data held in another processor, data is transferred in a message communication. In the message communication, it is desired that data be transferred at a high as possible speed. To speed up the message communication, it is necessary to efficiently perform data buffering. The present invention is intended to realize a high-speed buffering system.

(2) Description of the Prior Art

FIG. 1 shows a conventional parallel computer system, which comprises a plurality of processors 1 and 1' and a network 2. Each of the processors 1 and 1' comprises a CPU (Central Processing Unit) 3, a main memory 4, a DMA (Direct Memory Access) controller 5, a communication device 6, a common bus controller 6a, and a receiving buffer 7. These structural parts are connected to each other via a common bus BUS. The network 2 makes it possible for arbitrary processors, such as the processors 1 and 1', to communicate with each other. The communication device 6 executes an interface control process for the message communication. Data received from the network 2 is written into the receiving buffer 7 formed in the main memory 4. Data transmitted to the network 2 is read out from a sending buffer formed in the main memory 4. In order to simplify the explanation about the data receiving operation given below, only the receiving buffer 7 formed in the main memory 4 is illustrated in FIG. 1. The DMA controller 5 executes, instead of the CPU 3, a buffer access control process for the data write and read operations. Parameters necessary for the buffer access control process are set by an instruction executed by the CPU 3.

The data receiving operation in the conventional message communication comprises the following first through fifth steps. In the first step of the data receiving operation, a sending processor (processor 1', for example) generates a message, which is transferred via the network 2 and received by a receiving processor (processor 1, for example). In the second step, the communication device 6 of the receiving processor 1 sends an interruption request to the CPU 3, and thereby informs the CPU 3 of the arrival of the message. In the third step, the CPU 3 acquires the receiving buffer 7 in the main memory 4. In the fourth step, the CPU 3 sets parameters, such as an address of the receiving buffer 7 and a received data length, in the DMA controller 5. In the fifth step, the data receiving operation is started while the CPU 3 and the DMA cooperate with each other.

In order to increase the speed of the above message communication, it is necessary to consider the time necessary to execute the second through fourth steps as well as the time necessary to interrupt the operation of the CPU 3 and execute a corresponding process when the receiving buffer 7 overruns. As the times directly relate to the operation of the CPU 3, they cannot be greatly reduced if the communication device 6 is designed to operate at a higher speed.

In order to reduce the above disadvantage, a receiving buffer of a ring buffer type as shown in FIG. 2 has been proposed. A fixed area in the ring buffer can be continuously and circularly accessed by means of a read pointer (RDP) and a write pointer (WTP). In this manner, the tolerance of the storage capacity of the receiving buffer can be increased, and the setup process of the receiving buffer can be simplified so that the overhead thereof can be reduced. If the write operation or the read operation of the ring buffer excessively advances, the receiving buffer will overrun or underrun.

Japanese Laid-Open Patent Publication No. 59-112327 proposes a ring buffer control system in which the high-order address of a buffer area is expanded, and an overrun of the ring buffer is neglected so that the address wraps-around. According to this proposal, it is possible to increase the buffer capacity However, the proposed ring buffer control system does not have means for detecting an overrun and underrun of the ring buffer. Further, it is very difficult to identify an area of the ring buffer in which received data has not yet been processed.

Japanese Laid-Open Patent Publication No. 60-78570 discloses a ring buffer realized by the combination of the CPU and the DMA. No special improvement in the ring buffer has been proposed, and the CPU is interrupted each time data is received. The above is implemented by software, which is not designed to substantially prevent the ring buffer from overrunning. Further, the performance (efficiency of processing) of the proposed ring buffer is slightly less than ½ because the CPU has a shared bus structure manages data and is interrupted each time data is received. The interruption procedure is implemented by software.

As described above, the conventional ring buffer control systems do not have special means for preventing the ring buffer from overrunning and underrunning.

SUMMARY OF THE INVENTION

It is a general object of the present invention to provide a ring buffer control system in which the above disadvantages are eliminated.

A more specific object of the present invention is to provide a ring buffer control system which has hardware means for effectively preventing a ring buffer from overrunning and underrunning.

The above objects of the present invention are achieved by a receiving buffer control system comprising: a memory having a buffer area serving as a receiving buffer, data being applied to the memory via a bus; a write pointer, coupled to the memory, for indicating a write address of the buffer area; a read pointer, coupled to the memory, for indicating a read address of the buffer area; an overrun/underrun detection circuit, coupled to the write and read pointers, for detecting a situation in which an overrun or an underrun will occur in the buffer area in response to the write address indicated by the write pointer and the read address indicated by the read pointer; and a control part, coupled to the memory and the overrun/underrun detection circuit, for preventing the data from being written into and read out from the buffer area when the overrun/underrun detection circuit detects the situation.

BRIEF DESCRIPTION OF THE DRAWINGS

Other objects, features and advantages of the present invention will become more apparent from the following detailed description when read in conjunction with the accompanying drawings, in which:

FIG. 6 is a block diagram of a data size multiplexer in the output address generator shown in FIG. 5;

FIG. 14 is a diagram of a structure used when a plurality of receiving buffers are employed.

DESCRIPTION OF THE PREFERRED EMBODIMENTS

Figure 3:
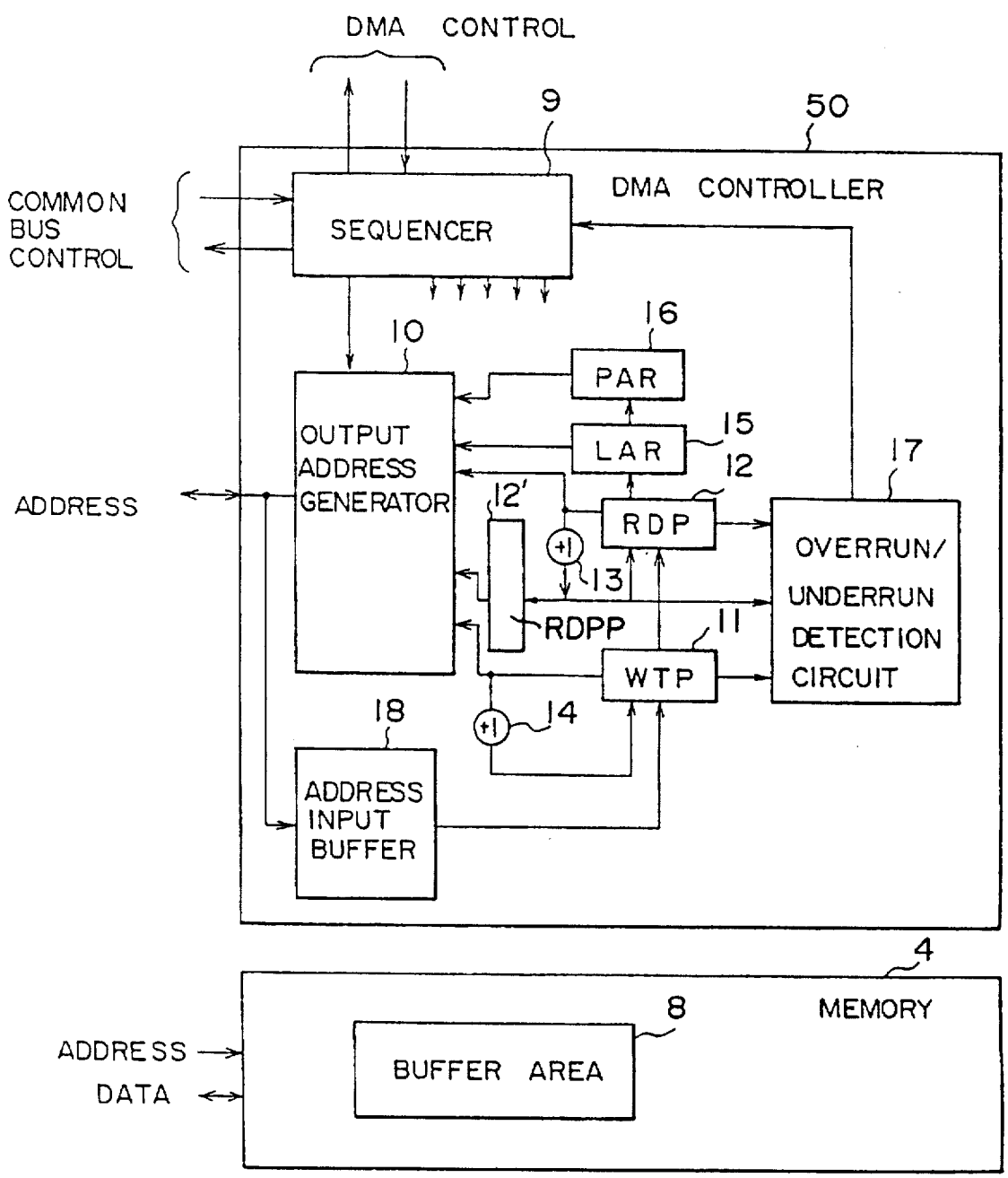
FIG. 3 is a block diagram illustrating an outline of an embodiment of the present invention.

FIG. 3 shows the outline of an embodiment of the present invention. A DMA controller 50 is substituted for the DMA controller 5 shown in FIG. 1 The DMA controller 50 is configured as follows. A sequencer 9 controls the operations of the structural parts of the DMA controller 50 in accordance with predetermined sequences. An output address generator 10 generates a memory access address. A write pointer (WTP) 11 specifies the next write address. A read pointer (RDP) 12 specifies the next read address. A register (RDPP) 12' holds an advanced read address (RDP+1) which precedes, by one, to the read address specified by the read pointer 12. An adder 13 increments, by one, the read address specified by the read pointer 12. An adder 14 increments, by one, the write address specified by the write pointer 17. A logical address base register (LAR) 15 holds the starting address of a buffer area 8 formed in the main memory 4 in the form of a logical (virtual) address. A real address base register (PAR) 16 holds the starting address of the buffer area 8 in the form of a real (physical) address.

An overrun/underrun detection circuit 17 compares the write address specified by the write pointer 11 with the read address specified by the read pointer 12 as well as the address registered in the register 12'. When the write address matches either the address specified by the read pointer 12 or the address in the register 12', the overrun/underrun detection circuit 17 concludes that the buffer area 8 will overrun or underrun. The detection of the overrun is executed by the write pointer 11 and the read pointer 12. The detection of the underrun is executed by the write pointer 11 and the register 12'.

An address input buffer 18 holds an address written by the CPU 3 (FIG. 3). The address in the address input buffer 18 is selectively written into the pointers 11 and 12 and the base registers 15 and 16 under the control of the CPU 3.

The receiving buffer of the ring buffer type is formed in the buffer area 8 in the main memory 4 and an access mechanism including the pointers 11 and 12 and the base registers 15 and 16 in the DMA controller 50.

The logical address of the starting position of the buffer area 8 is held in the base register 15, and the real address after address conversion is held in the base register 16. When the accessing source is a user program, the logical address is used as the base address. When the accessing source is a system program, the real address is used as the base address. The base address is combined with the address in either the write pointer 11 or the read pointer 12, which functions as a relative address.

The write pointer 11 is referred to when received data is written into the buffer area 8. The address in the write pointer 11 is incremented by 1 when the write operation ends. The address in the read pointer 12 is updated by the content of the register 12' when the content of the register 12' is read. The content of the register 12' is equal to an address obtained by increasing, by one, the address in the read pointer 12 used in the in the immediately previous access for data reading.

The output address generator 10 selects, on the basis of whether the access mode is a logical address mode or a real address mode or whether the access is for the data write or data read, an output address from among the addresses of t he pointers 11 and 12 and the registers 12', 15 and 16. During this selection, the buffer size is taken into account so that the updating of the address executed by increasing the address in the pointer 11 or 12 conforms to a circulating address change within a predetermined area. The output address generator 10 sends back, to the CPU 2 instead of address, information (NULL) showing there is no data to be read out from the buffer area 8 in response to a data request from the register 12'.

The sequencer 9 sends and receives control signals to and from the communication device 6 (FIG. 1) and the common bus controller 6a. The sequencer 9 acquires the right to use the common bus BUS, and executes the access control in accordance with a data transfer request and a transfer completion notification signal. When the buffer area 8 overruns or underruns or when an error has occurred, the sequencer 9 stops the access control.

Initially, the address of the starting position of the buffer areas is written into the write pointer 11, and the address of the end position of the buffer area 8 is written into the read pointer 12. When the communication device 6 (FIG. 1) requests that data be transferred, the DMA controller 50 sequentially writes the received data in the buffer area 8 starting from the address specified by the write pointer 11. With this operation, it is possible for the processor to continuously execute an operation without being affected by message transmission non-periodically generated by another processor. When a message is needed, the processor can immediately obtain the starting address of the area in which the needed data is stored or can immediately acknowledge that there is no data which is to be read. A decision on whether the buffer overruns or underruns is made by means of hardware. When the buffer overruns, the processor is notified of the overrun by an interruption procedure, or the data transfer is stopped until a receiving area becomes available in the buffer area 8 by executing the data read operation. It is possible for the user to select one of the above procedures.

It is possible to obtain necessary information about the status of the buffer by reading the contents of the pointers 11 and 12 and the register 12' which manage the buffer. The starting position of data which has not yet been read, can be identified from the read address specified by the pointer 12. It is possible to determine up to which position of the buffer data to be read, exists by reading the write address specified by the write pointer 11. By reading the address in the register 12' (or the advanced read address), the area accessed immediately before being specified by the read pointer 12 can be released, and the address specified by the read pointer 12 is replaced with the address (RDP+1) in the register 12'.

Figure 4:
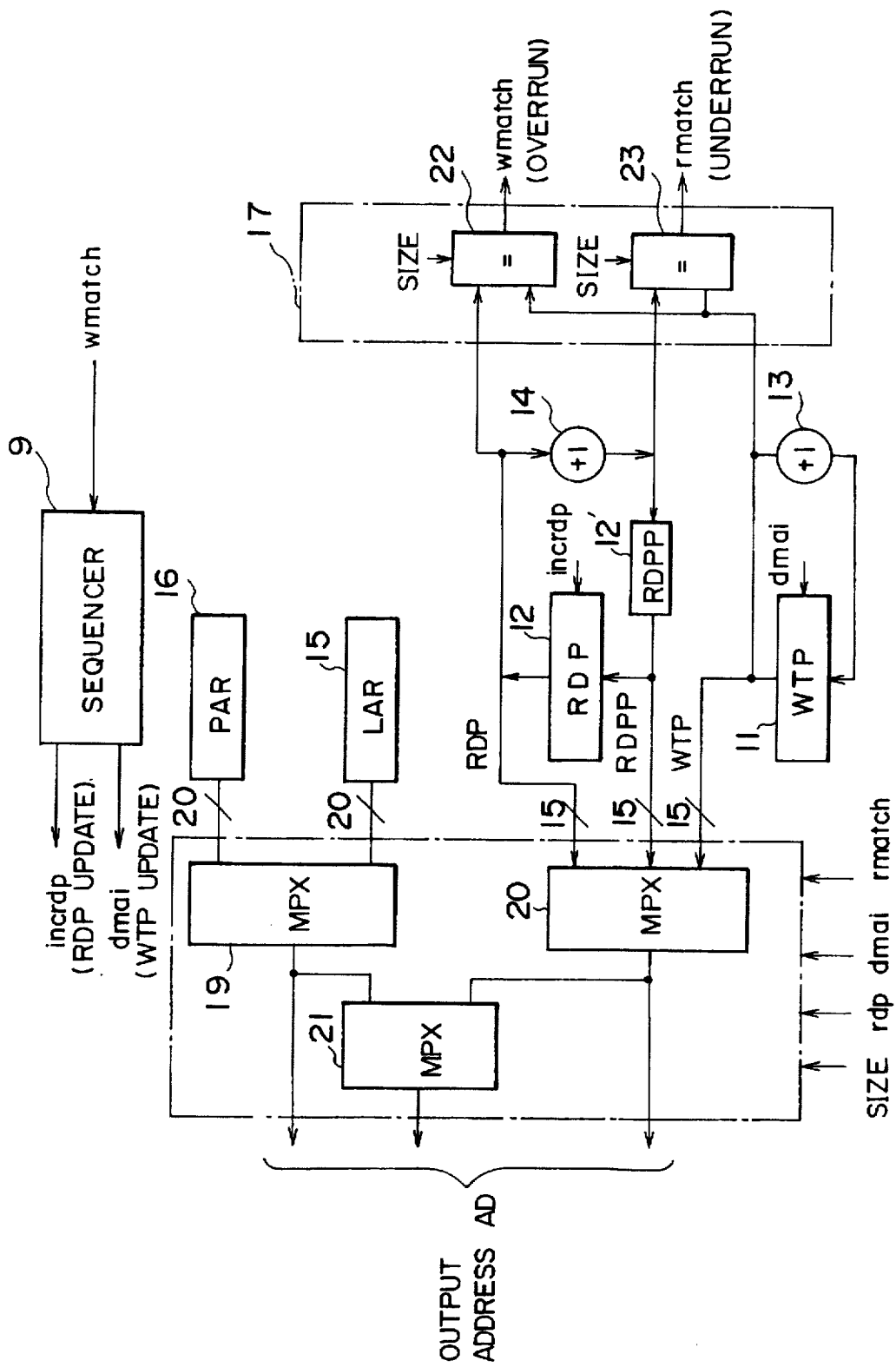
FIG. 4 is a block diagram of a DMA controller shown in FIG. 3.

FIG. 4 shows the DMA controller 50 shown in FIG. 3 in more detail. The output address generator 10 comprises multiplexers (MPX) 19-21. The overrun/underrun detection circuit 17 comprises comparators 22 and 23. During continuous accessing, the sequencer 9 generates a read pointer (RDP) updating signal incrdp, and a write pointer (WTP) updating signal dmai. Further, the sequencer 9 stops the access control in response to an overrun detection signal wmatch. The write pointer WTP 11 and the read pointer RDP 12 are respectively it incremented by 1 in response to the WTP updating signal dmai and the RDP updating signal incrdp.

The comparator 22 in the overrun/underrun detection circuit 17 compares the current address specified by the write pointer WTP 11 with the current address specified by the read pointer RDP 12. When these addresses match each other, the comparator 22 generates the overrun detection signal wmatch, and thereby informs the sequencer 9 that an overrun of the receiving buffer will occur during the next write operation.

The comparator 23 compares the address obtained by incrementing the address specified by the read pointer 12 by one with the current address specified by the write pointer 11. When these addresses match each other, the comparator 23 generates an underrun detection signal rmatch.

The mutiplexer 19 selects either the register 15 or the register 16 in accordance with a control signal (not shown for the sake of simplicity), which shows whether the accessing source is a user program or a system program. In this manner, a predetermined number of high-order bits of the output address are determined. The multiplexer 20 selects one of the read pointer RDP 12, the register ROPP 12', the write pointer WTP 11 and 0 in accordance with control signals, such as the RDP updating signal incrdp, the WTP updating sign dmai and the underrun detection signal rmatch. In this manner, a predetermined number of low-order bits of the output address are determined.

The multiplexer 21 has a decoder function of defining the receiving buffer size. In accordance with a specified size signal SIZE, the multiplexer 21 selects a predetermined number of middle-order bits out of the address bits from the multiplexer 19 or a predetermine number of middle-order bits out of the address bits from the multiplexer 20. The buffer size defined by the middle-order bits, and the output address endlessly changes in the buffer size unit even when the addresses of the pointers 11 and 12 are incremented by 1 in a direction.

Figure 5:
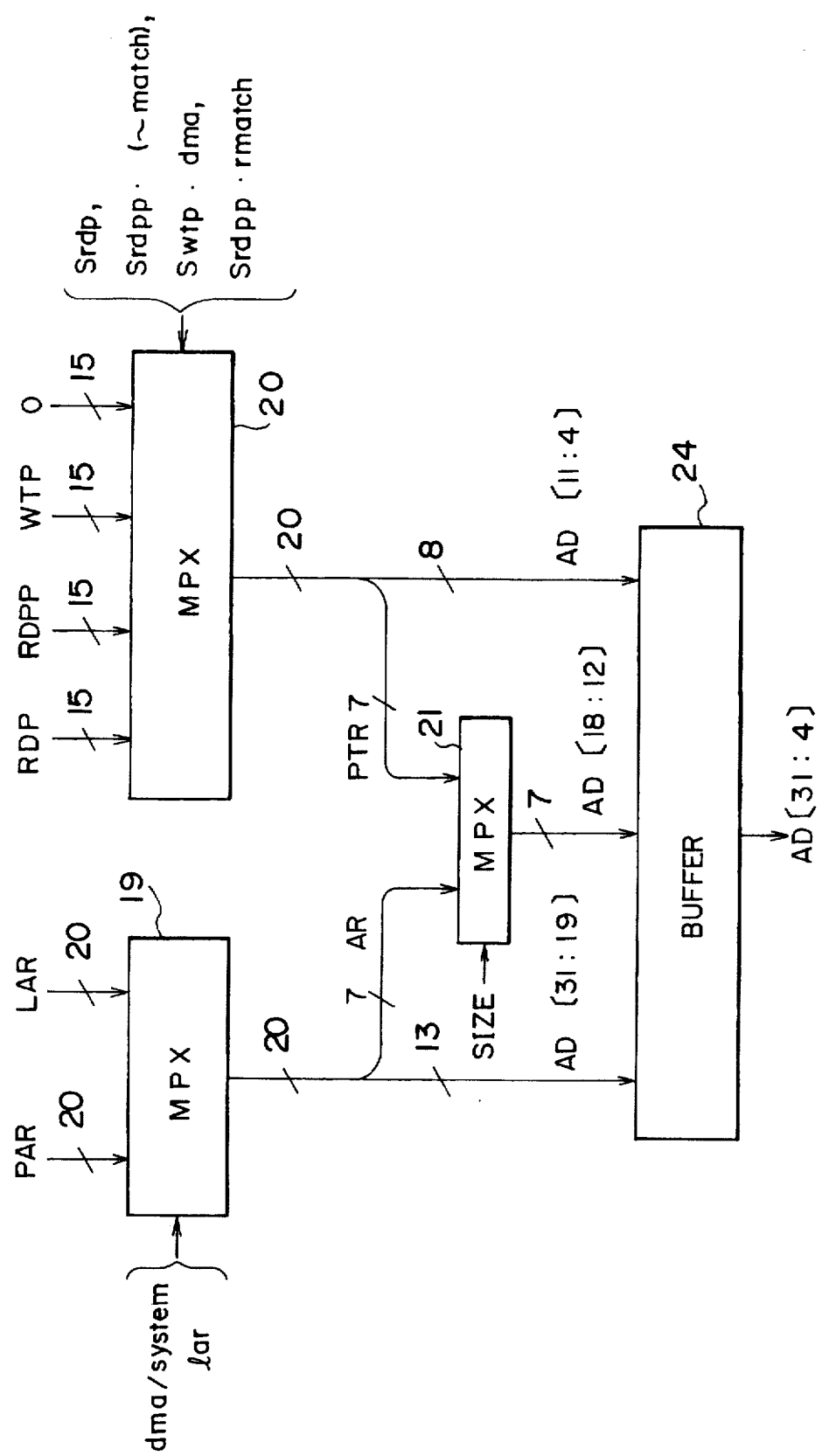
FIG. 5 is a block diagram of an output address generator shown in FIG. 3.

FIG. 5 shows the output address generator 10 in more detail. It will now be assumed that the bit width of data from each of the registers (LAR) 15 and (PAR) 16 is equal to 20 bits, and the bit width of data from each of the read pointer (RDP) 12, the register (RDPP) 12' and the write pointer (WTP) 11 is equal to 15 bits. Symbols Srdp, Srdpp and Swtp are select control signals which are generated by the sequencer 9 and applied to the RDP, RDPP and WTP, respectively. A symbol "dma" denotes the DMA access, "system" denotes an access from the system program, and "lar" denotes an access from the user program using the logical address.

When both the signals Srdpp and rmatch are 'H (high)', the multiplexer 19 selects 0. When either the signal dma or system is 'H' in cases other than the case where both the signal Srdpp and rmatch are 'H', the multiplexer 19 selects the real address PAR. When the signal lar is 'H' in cases other than the case where both the signal Srdpp and rmatch are 'H', the multiplexer 19 selects the logical address LAR.

The multiplexer 20 selects the read address RDP specified by the read pointer 12 when the signal Srdp is 'H', and selects the address RDPP in the register 12' when both the signals Srdpp and rmatch are 'H'. Further, the multiplexer 20 selects the write address specified by the write pointer WTP when either the signal Swtp or dma is 'H', and selects 0 when both the signals Srdpp and rmatch are 'H'.

The multiplexer 21 defines the buffer size. As shown in FIG. 6, the multiplexer 21 comprises a decoder (DEC) 25 and multiplexers (MPX) 26-0–26-6. The decoder 25 converts three-bit data showing the buffer size into seven signals SIZE 0, SIZE 1-0, SIZE 2-0, . . . , SIZE 6-0, which are applied to the multiplexers 26-0–26-6, respectively. The signal SIZE0 output by the decoder 25 is 'H' only when the buffer size data SIZE indicates 0. The signal SIZE 1-0 is 'H' when the buffer size data SIZE indicates either 1 or 0. The signal SIZE 2-0 is 'H' when the buffer size data SIZE is one of 2, 1 and 0. Generally, a signal SIZE i-0 (where i=0, 1, 2, . . . , 6) is 'H' when the buffer size data SIZE indicates a value smaller than or equal to the value i. The multiplexers 26-0–26-6 respectively receive seven low-order bits AR(6)–AR(0) from the multiplexer 19 and seven high-order bits PTR(6)–PTR(0). Each multiplexer 26-i selects the bit on the AR side when the signal SIZE i-0 is 'H'.

Returning now to FIG. 5, the high-order, middle-order and low-order address bits respectively output from the multiplexers 19, 20 and 21 are combined with each other in the buffer 24, and output as an address AD.

Figure 7A:
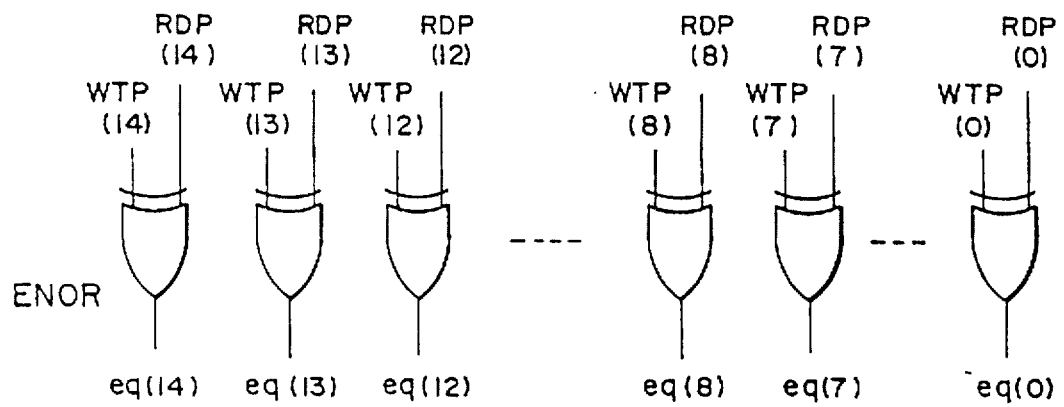
FIGS. 7A, 7B and 7C are circuit diagram of an overrun/underrun detection circuit shown in FIG. 3.
Figure 7B:
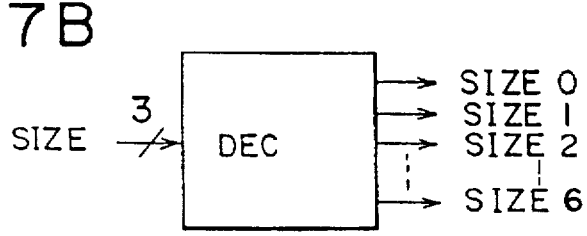
Figure 7C:
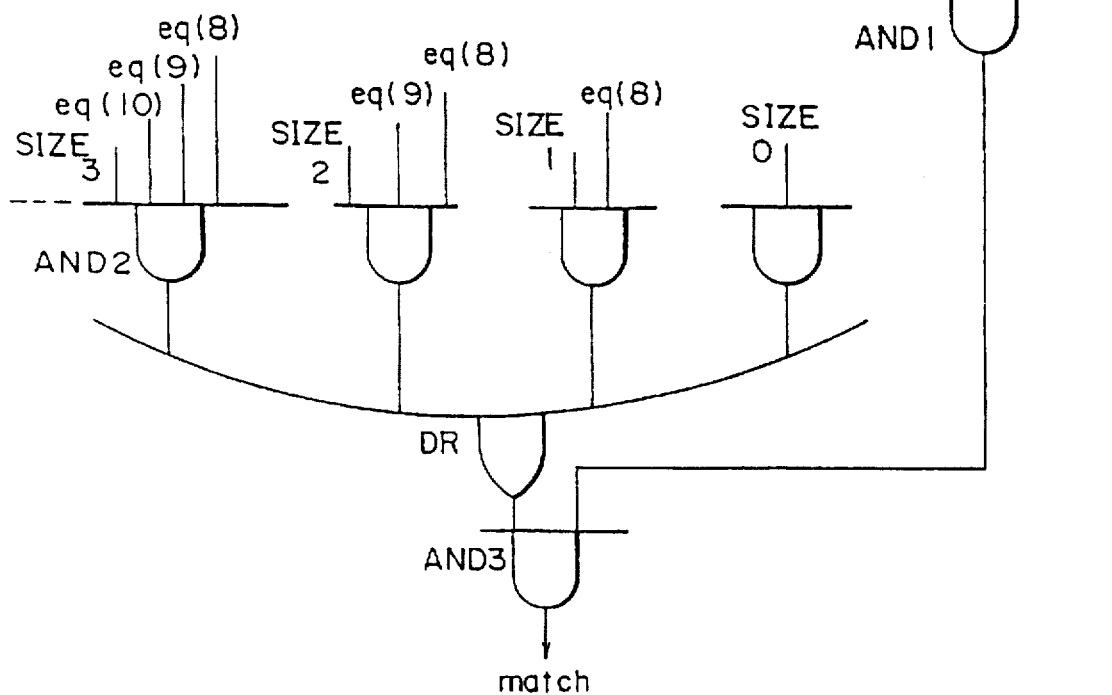

FIGS. 7A, 7B and 7C show the overrun/underrun detection circuit 17 in detail. FIG. 7A shows the configuration of each of the comparators 22 and 23. Each comparator comprises 15 ENOR (Exclusive-NOR) circuits, which respectively compare the 15 bits of the write address WTP with the 15 bits of the read address RDP. Output signals of the 15 ENOR circuits are denoted by eq(0)–eq(14).

FIG. 7B shows a decoder which decodes the buffer size signal SIZE. The decoder shown in FIG. 7B converts the three bits of the signal SIZE into seven signals SIZE 0–SIZE 6

FIG. 7C shows a detection signal generator which generates the overrun detection signal wmatch or the underrun detection signal rmatch. In FIG. 7C, a signal "match" denotes either the signal wmatch or rmatch. An AND circuit AND1 detects a status where all the low-order bits eq(7) –eq(0) are 'H'. A plurality of AND circuits AND2 receive a predetermined number of high-order bits out of the high-order bits eq(14)–eq(8) and a corresponding one of the signals SIZE i. This is intended to change the comparison range on the basis of the specified buffer size SIZE i. Output signals of the AND circuits AND2 are applied to an OR circuit, an output signal of which is applied to an AND circuit AND3. An output signal of the AND circuit AND1 is applied to the AND circuit AND3. An output signal of the AND circuit AND3 is the detection signal wmatch or rmatch.

Figure 8:
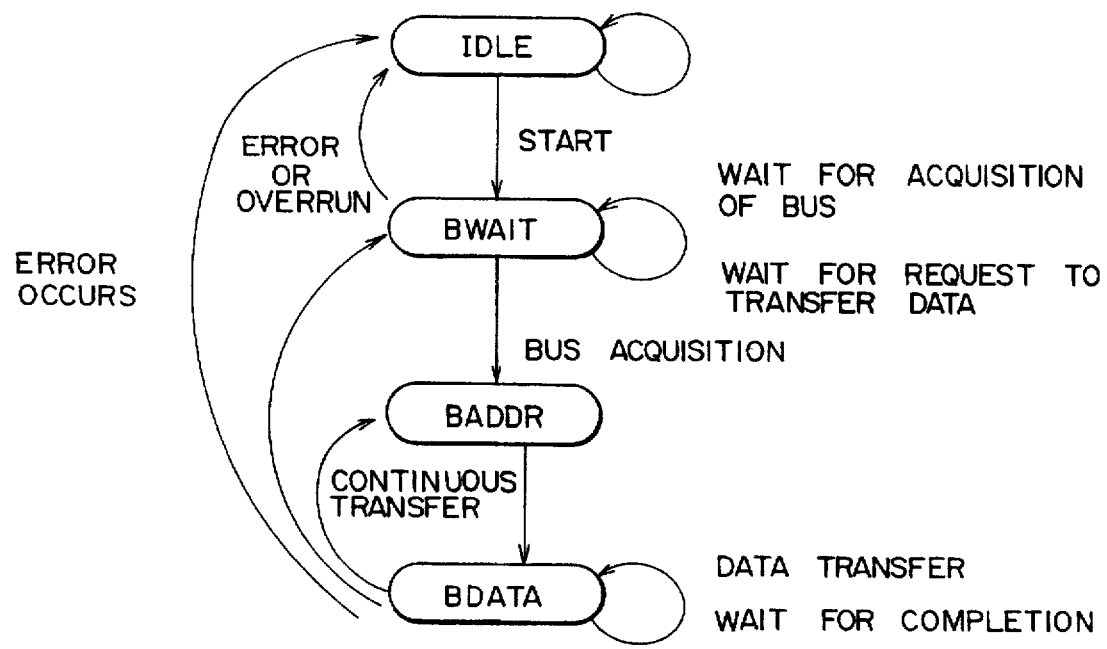
FIG. 8 is a diagram showing the state transition of a sequencer shown in FIG. 3.

FIG. 8 is a diagram showing a state transition controlled by the sequencer 9 shown in FIG. 3. In FIG. 8, "IDLE" denotes an operation halt state, and "BWAIT", "BADDR" and "BWAIT" denote operating states. When an error has occurred in the states "BWAIT", "BADDR" and "BWAIT", the state returns to the state IDLE. In the state BWAIT, the communication device 6 (FIG. 1) becomes ready to transfer data, generates the data transfer request when the receiving buffer has a sufficient idle area, and waits for acquisition of the bus.

When the bus has been acquired in the state BWAIT, so that data is allowed to be transferred, the sequencer 9 switches to the state BADDR. In this state, an address is output to the address bus. After one clock from this address output operation, the sequencer 9 switches to the state BDATA, in which the sequencer 9 waits for completion of the data transfer. If a subsequent data transfer request has been generated and the right to use the bus has been acquired after the completion of the data transfer is acknowledged, the sequencer 9 returns to the state BADDR, in which data is continuously transferred. If there is no data transfer request, the sequencer 9 returns to the state BWAIT, and waits for another data transfer request.

A description will now be given of the operation of the embodiment of the present invention.

Figure 9:
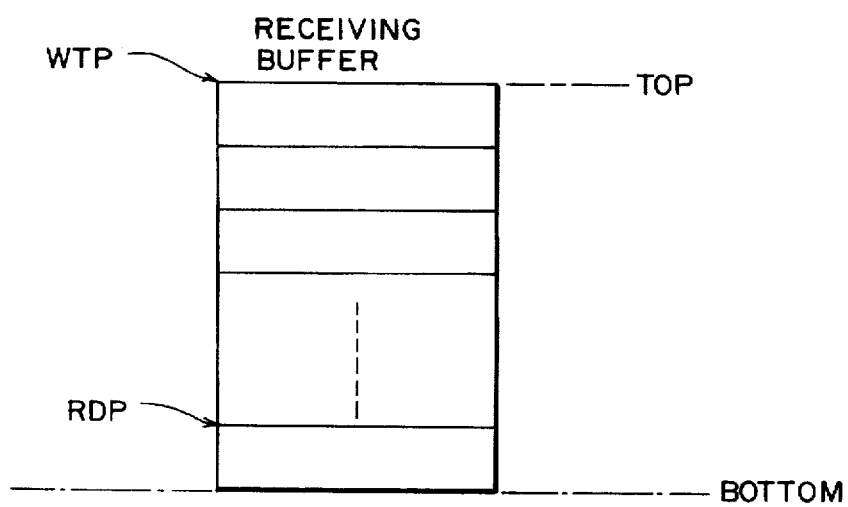
FIG. 9 is a diagram showing an initialized state of a receiving buffer.

As shown in FIG. 9, when the CPU 3 (FIG. 1) reads the address in the register (RDPP) 12' in the state where the write pointer (WTP) 11 indicates the top of the receiving buffer and the read pointer (RDI) 12 indicates the bottom thereof, 0 (NULL) is sent back to the CPU 3 since there is no data in the receiving buffer. In FIG. 5, the following is obtained:

Srdpp=1, rmatch =CMP(RDP+1, WTP)=1.

Hence the output address is zero (AD=0). In this manner, it is easy for the CPU 3 to determine whether or not there is data in the receiving buffer.

An example of use of the receiving buffer will now be described. A description will now be given of a case where an area of 8 Kbyts from real address 0X' 5A000 to real address 0X' 5BFFF is used. In this state, it will now be assumed that the memory space is mapped from address 0X' 82000. In order to distinguish the system mode and the user mode from each other, "sys" or "usr" is placed in advance of RDP and WTP.

The LAR, PAR, RDP and WTP are set as follows:

LAR←0X' 82000

PAR←0X' 5A000

RDP←0X' 01FF0

WTP←0X' 00000.

The RDP and WTP are initialized when they are reset.

A command register BCMD, which is a control register always provided for the DMA controller, is set. Similarly, a status register BRST is provided.

For SIZE=110, WC=0 and ST=1,

BCMD←0X' 8600000.

When the read address (RDP) of the read pointer 12 and the write address (WTP) of the write pointer 11 are read, the following is obtained:

sys RDP=0X' 5BFF0 usr RDP=0X' 83FF0 sys WTP=0X' 5A000 usr WTP=0X' 82000.

However, since the receiving buffer does not have data, when the register (RDPP) 12' is read, the following is sent back:

sys RDPP=0X' 00000 usr RDPP=0X' 00000.

When data equal to three blocks (16 bytes per block) is received, the write pointer WTP is sequentially updated in the following manner, and the received data is written into the receiving buffer:

sys 0X' 5A000 sys 0X' 5A010 sys 0X' 5A020.

When all the data has been completely received, the write address WTP of the write pointer 11 is 0X' 5A030.

At this time, when the content PDPP of the register 12' is read, the following information is sequentially obtained:

usr RDPP=0X' 82000 (which shows that data of the first block is placed at the user address 0X' 82000 (system address 0X' 5A000));

usr RDPP=0X' 82010 (which is the user address of data of the second block);

usr RDPP=0X' 82020 (which is the user address of data of the third block);

usr RDPP=0X' 00000 (which shows there is no data); and usr RDPP=0X' 00000 (which shows there is no data). In this manner, the user program (CPU 3) can recognize that there is no data subsequent to the three blocks.

When data equal to 8 Kbytes has been received and hence the receiving buffer has been filled with the data, the receiving buffer overruns and the overrun detection signal wmatch becomes equal to 1 (wmatch=1) Thus, the sequencer 9 (FIG. 3) temporarily halts the data transfer in order to prevent data from being lost.

The read address RDP of the read pointer 12 is updated by the content RDPP of the register 12'. When an idle area in the receiving buffer becomes available, the data receiving operation is restarted.

If data which is recognized to be unnecessary beforehand is contained in the received data, the read pointer 12 is rewritten so that the read operation jumps some data. For example, when the read address RDP and the write address WTP are as follows:

sys RDP=0X' 5A010 sys WTP=0X' 5A810 the following is written into the read pointer RDP in order to jump data equal to 16 blocks:

sys RDP←0X' 5A110.

The writing operation on the register is performed via the bus which is also used for the DMA transfer operation. Hence, the DMA controller 50 does not execute the next operation until the above Jumping operation is completed.

Figure 1:
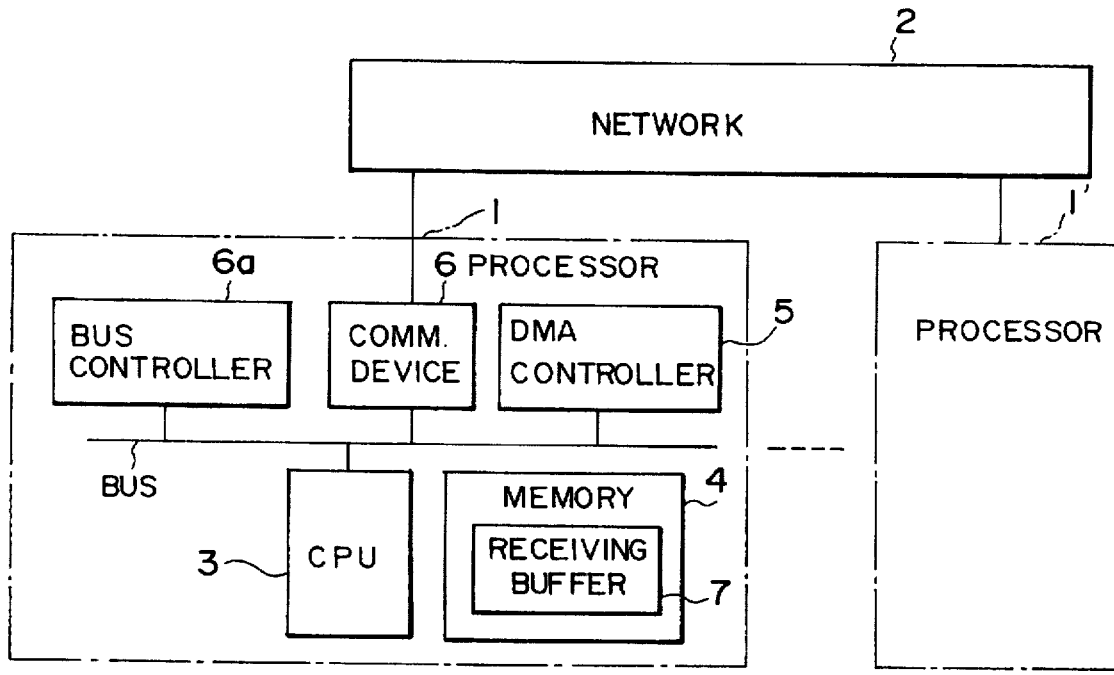
FIG. 1 is a block diagram of a conventional parallel processor system.
Figure 2:
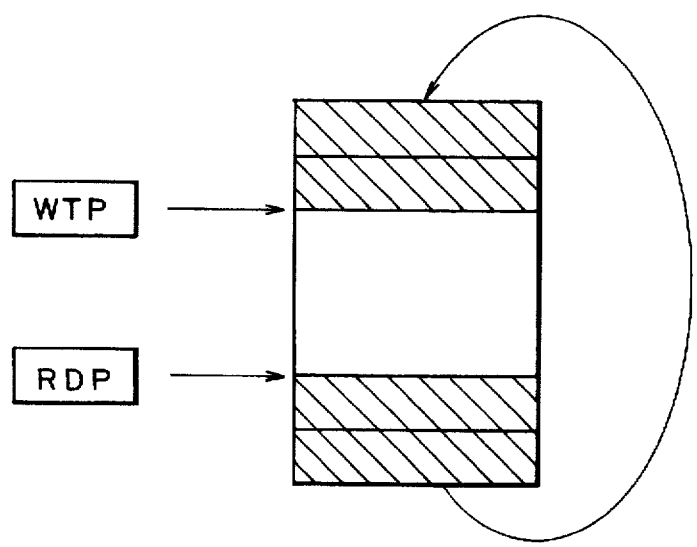
FIG. 2 is a block diagram illustrating a conventional ring buffer.

As shown in FIG. 1, when the received data requested to be read is split into two areas (split data), thereby becoming split data as follows:

0X' 5BF00–0X' 5BFFF

Figure 10:
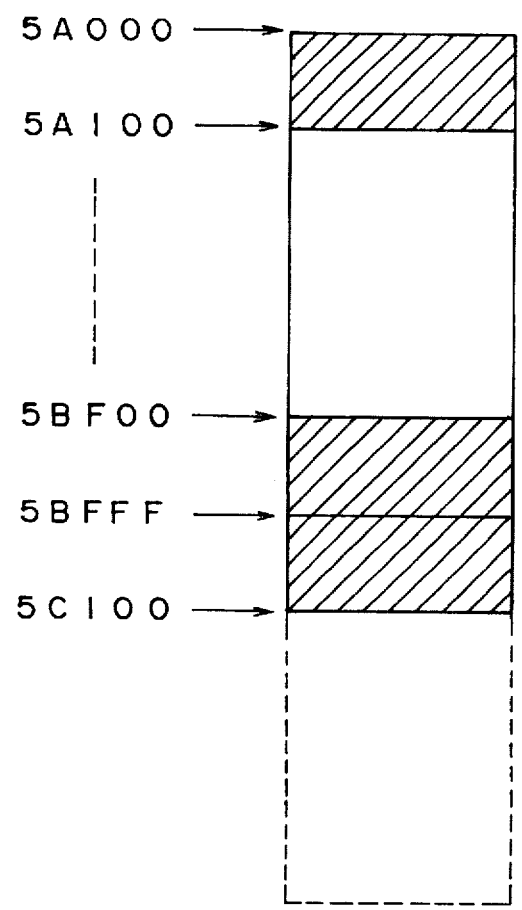
FIG. 10 is a diagram showing a process of continuously accessing split data.

0X' 5A000–0X' 5A0FF it is possible to continuously access these areas by doubling the buffer area, as shown by a broken line in FIG. 10.

There is a possibility that the data written into the main memory will not coincide with data written into a cache memory. By invalidating the data in the cache memory by using the address in the register (RDPP) 12', it becomes possible to ensure the matching between data in the main memory and data in the cache memory.

Figure 11A:
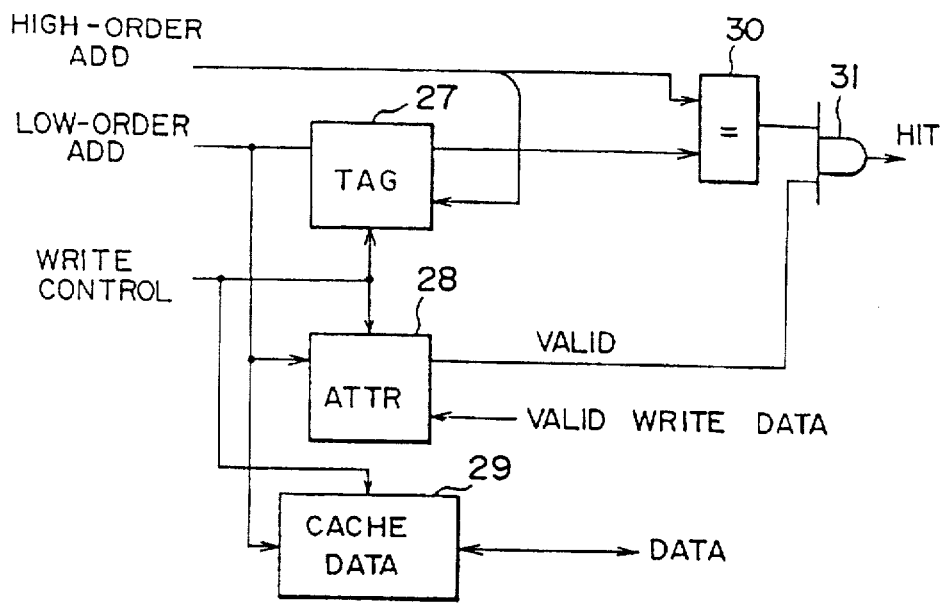
FIG. 11A is a block diagram of a conventional cache data invalidating circuit.
Figure 11B:
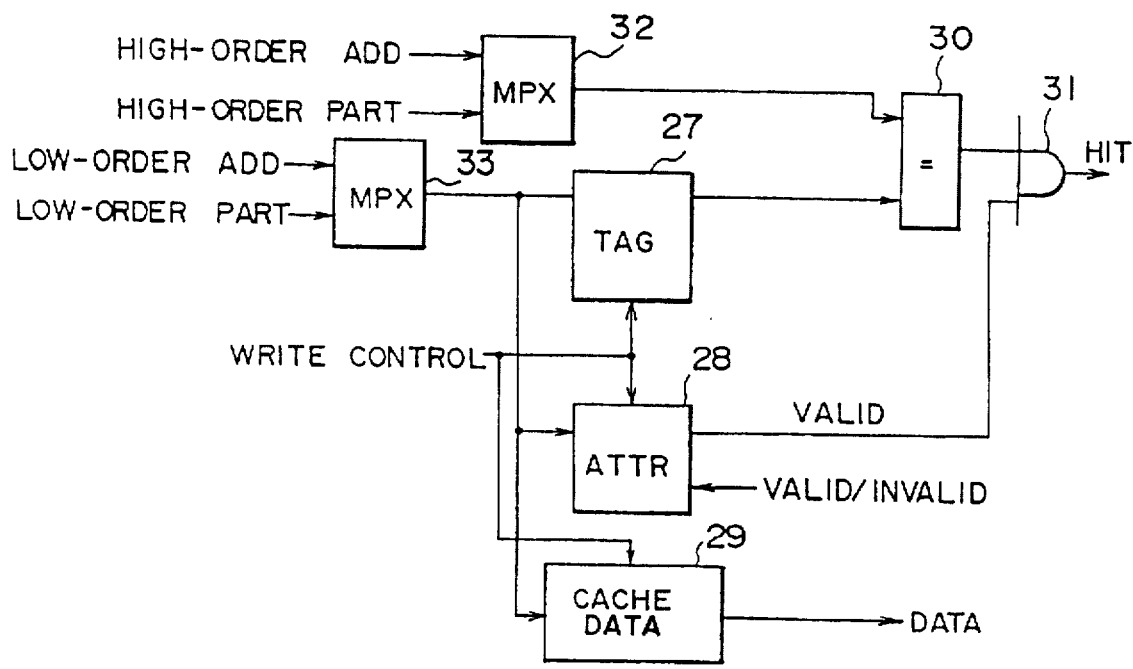
FIG. 11B is a block diagram of a cache data invalidating circuit use in the embodiment.
Figure 12:
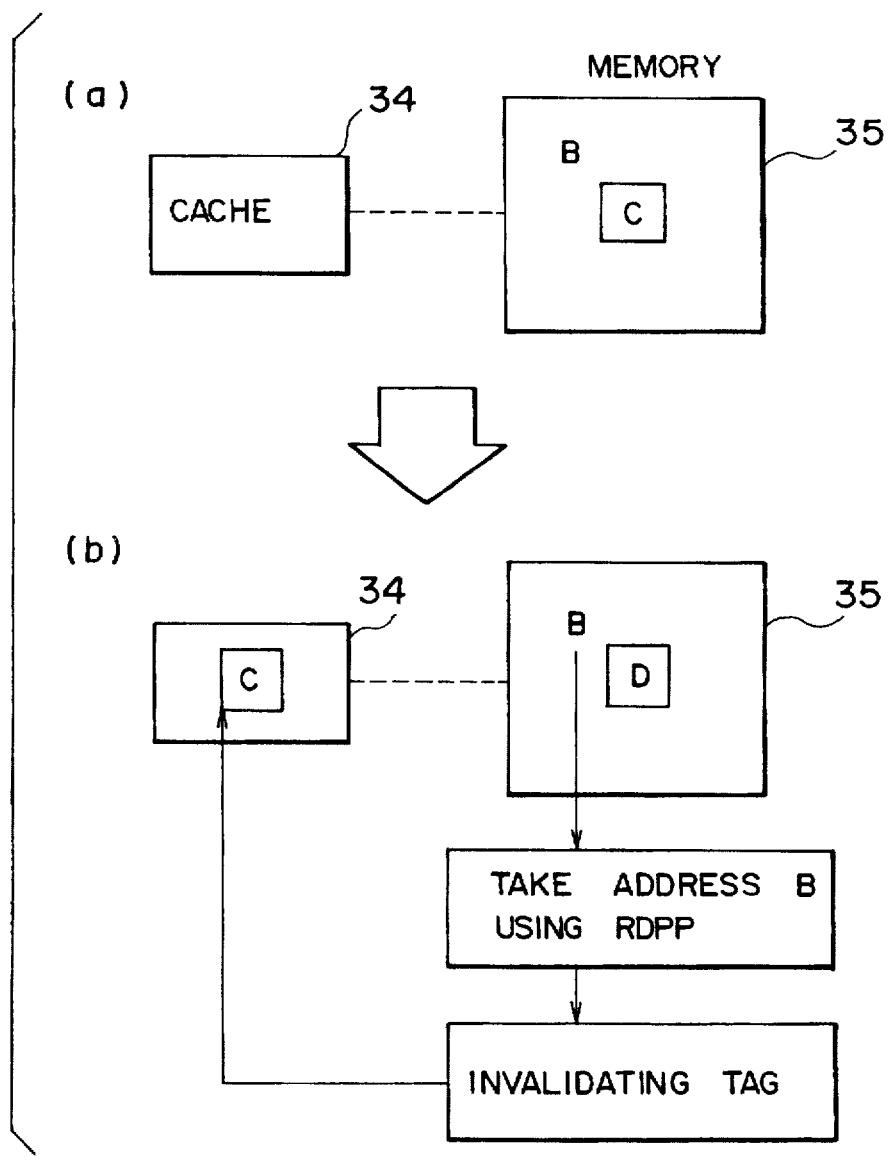
FIG. 12 is a block diagram showing a process of invalidating cache data according to the embodiment of the present invention

A process of invalidating data in the cache memory will now be described with reference to FIGS. 11A, 11B and 12. FIG. 11A shows a conventional cache data invalidating circuit, and FIG. 11B shows a cache data invalidating circuit according to the embodiment of the present invention. The circuit shown in FIG. 11A comprises a tag memory (TAG) 27, an attribute memory (ATTR) 28, a cache data memory 29, a comparator 30, and an AND gate 31. The address ADD split into a high-order address and a low-order address. The tag memory 27 the attribute memory 28 and the cache data memory 29 are simultaneously accessed by the low-order address. When the content of the tag memory 27 is the same as the high-order address and the content of the attribute memory 28 indicates "valid", a hit signal is output by the AND gate and cache data is used. If the content of the tag memory 27 does not coincide with the high-order address or the content of the attribute memory 28 indicates "invalid", data is read out from the main memory. The data is held in the cache memory until data has the same tag as that of the data in the cache memory.

When data is written into the main memory with respect to the address of data held in the cache memory by an I/O process of data receiving and writing, data in the main memory becomes different from data in the cache memory.

As shown in FIG. 12(a), data C is stored in an area of a main memory 35 specified by address B. When the data C is read out from the main memory 35, the data C is held in a cache memory 34. Thereafter, when data D is written into the area of the main memory 35 specified by address B, as shown in FIG. 12(b) the data in the cache memory 34 does not coincide with the data in the main memory 35. When the cache memory 34 is accessed in order to read the data D therefrom, the data is read out therefrom since the data C in the cache memory 34 specified by address B is still valid. That is, data D cannot be read out from the cache memory 34.

Hence, it is necessary to invalidate data in the cache memory 34 specified by the updated address of the main memory 35. According to the embodiment of the present invention, when the data read operation is executed after received data is written in the receiving buffer in the main memory, the address RDPP in the register 12' is read and then output to the bus. The data in the cache memory 34 is invalidated by using the above address (see FIG. 12(b)).

FIG. 11B shows the cache data invalidating circuit which realizes the above procedure. The circuit shown in FIG. 11B comprises multiplexers 32 and 33. The multiplexer 32 receives a high-order part of the address RDPP which is read out from the register 12' and output to the common bus by the DMA controller 50. The multiplexer 33 receives a low-order part of the above address PDPP. Further, the multiplexers 32 and 33 receive the high-order and low-order parts of the address ADD, respectively. When the address RDPP is read out from the register 12', the high-order and low-order parts of the address RDPP are respectively selected by the multiplexers 32 and 33 instead of the high-order and low-order parts of the address ADD. Then, the tag memory 27 and the attribute memory 29 are accessed by the selected address. When the hit signal is output, the invalid signal is written into the attribute memory 28, so that data in the cache memory 34 can be invalidated.

Figure 13A:
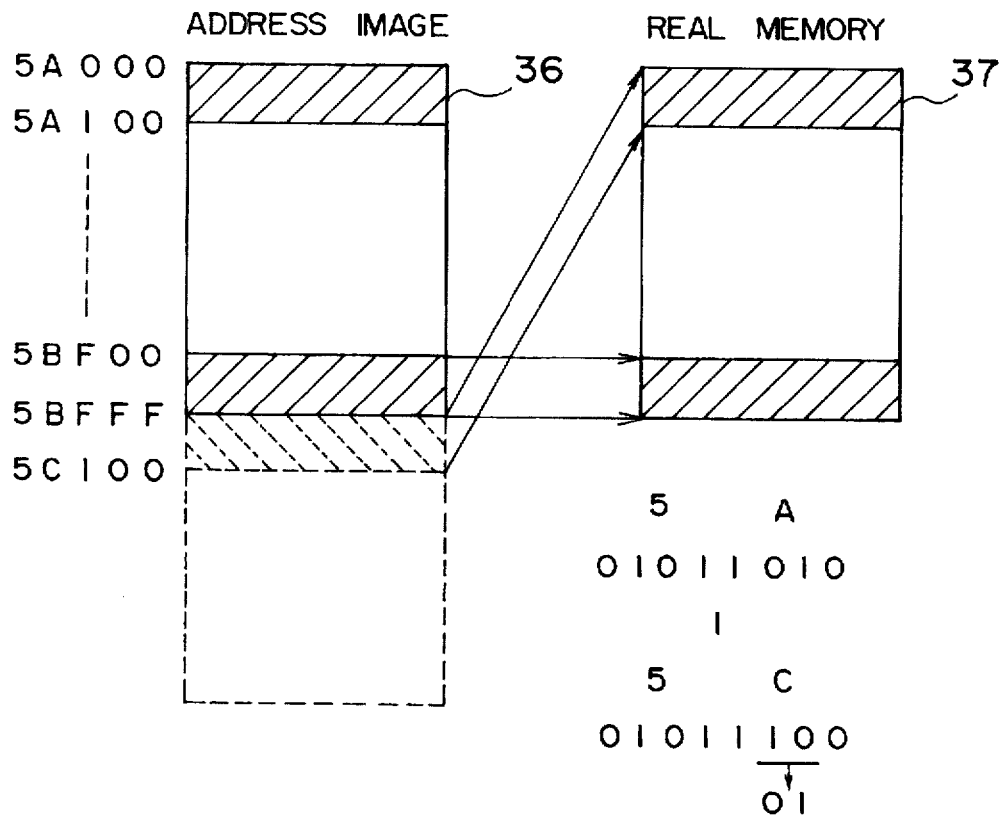
FIG. 13A is a diagram showing how addresses are processed in order to continuously read split data.
Figure 13B:
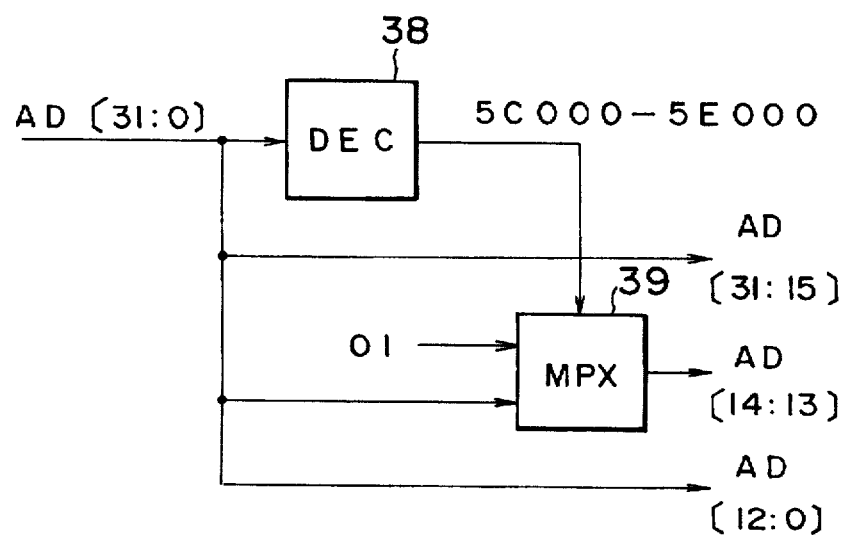
FIG. 13B is a block diagram of a structure for executing the address processing shown in FIG. 13A.

A description will now be given, with reference to FIGS. 13A and 13B, of a circuit capable of continuously accessing data split in the upper and lower part of the receiving buffer. As shown in FIG. 13A, a mapping is carried out so that addresses spaced apart from each other in a real memory 37 become consecutive addresses. An address area (address image) twice the size of the real buffer area is provided in order to avoid the separation of addresses specifying the received data.

For example, addresses 5C000–5E000 of an address image 36 are placed in addresses 5A000–5C000 of the real memory 37. By accessing the addresses 5BF00–5C100, it becomes possible to continuously read out data split in the real memory 37. FIG. 13B shows an address conversion circuit which implements the above address conversion. An address bit AD[14:13] is converted into '01' between 5C000–5E000. A decoder (DEC) 38 detects a section in which the address conversion should be performed, and a multiplexer (MPX) 39 converts the bit value when the section is detected.

A description will now be given, with reference to FIG. 14, of a structure in which a plurality of receiving buffers are provided, these buffers being selectively used on the basis of the type of received data and/or the type of the accessing source. As shown in FIG. 14(a), a plurality of sets of the registers RDP, WTP, LAR, PAR, BCMD and BRST are provided and selectively used on the basis of the message type and/or a task ID.

The message type can be extracted from a header of the received data, and the task ID can be obtained in a register which holds the task ID. FIG. 14(b) is a detailed view of the structure having a plurality of receiving buffers. As shown in this figure, a plurality of register groups 40–42 relating to the respective types of, for example, messages, are chained and further connected to a decoder (DEC) 44. A register 43, which is connected to the decoder 44, holds data showing a desired type of message. The above data is written into the register 43 by, for example, the CPU 3 (FIG. 1). The decoder 44 decodes the data in the register 43, and selects one of the register groups 40–42. Each of the register groups 40–42 is assigned a plurality of addresses in order to selectively read out the data in the registers RDP, WTP, LAR, PAR, BCMD and BRST. With the above structure, it becomes possible to efficiently access only a specific message by a single interface.

The present invention has the following advantages. First, it becomes possible to omit a series of processes executed by the CPU after data arrives at the processor. Hence, it becomes possible to reduce the setup time after data is received and reduce the load of the CPU. Next, the pointers associated with the receiving buffer are automatically updated by hardware. Hence, it becomes possible to eliminate the problems arising from use of software. In addition, since the data read operation can be jumped, data can be efficiently read at a high speed. Also, information showing that no data is present in the receiving buffer can be obtained by referring to the information in the registers for managing the receiving buffer. Hence, data can be efficiently read out from the receiving buffer. The page address is managed in the form of logical address and real address. Hence, it becomes possible to rapidly generate the memory address even when the access mode is switched. By selectively using a plurality of receiving buffers on the basis of the message type or the task ID, it becomes possible to efficiently access specific data. It becomes possible to automatically invalidate data about the address of the cache memory by using the address in the register for managing the receiving buffer. Hence, the content of the cache memory always matches data in the main memory. By providing an address area twice that of the receiving buffer, it becomes possible to continuously access split data and hence efficiently execute the access operation.

The present invention is not limited to the specifically disclosed embodiments, and variations and modifications may be made without departing from the scope of the present invention.

What is claimed is:

1. A receiving ring buffer control mechanism in a parallel computer system in which a plurality of processors are connected to each other via a network, comprising in each processor:

a main memory having a buffer area serving as a receiving buffer, data being applied to said main memory via a bus;

a write pointer, coupled to said main memory, for indicating a write address of the buffer area;

a read pointer, coupled to said main memory, for indicating a read address of the buffer area;

an overrun/underrun detector, coupled to said write pointer and said read pointer, for detecting a situation in which an overrun or an underrun will occur in the buffer area in response to the write address indicated by said write pointer and said read address indicated by said read pointer; and a single DMA controller, coupled to said main memory and said overrun/underrun detector, for preventing the data from being written into and read out from the buffer area when said overrun/underrun detector detects said situation.

2. A receiving buffer control system as claimed in claim 1, further comprising a first update unit for storing an advanced read address which precedes said read address by a predetermined address value, said read address being indicated by said read pointer, and for updating said read address indicated by said read pointer with said advanced read address.

3. A receiving buffer control system as claimed in claim 1, further comprising means for writing an external read address into said read pointer, said external read address indicating that said data has been split in the buffer area, to produce split data that can be continuously read out from the buffer area.

4. A receiving buffer control system as claimed in claim 2, further comprising means for determining, on the basis of the advanced read address, whether said data is present in the buffer area.

5. A receiving buffer control system, comprising:

a memory having a buffer area serving as a receiving buffer, data being applied to said memory via a bus, write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation; and register means for holding a first base address representing a logical address and a second base address representing a real address, a selected one of said first base address and said second base address is used, based on an access mode corresponding to said data input to the buffer area, for updating the write address indicated by the write pointer means and the read address indicated by the read pointer means.

6. A receiving buffer control system for data of a plurality of types, comprising:

a memory having a buffer area serving as a receiving buffer, data being applied to said memory via a bus, said memory including a plurality of buffer areas;

write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation; and means for detecting which type of the plurality of types said data is and or selecting one of the plurality of buffer areas on the basis of the type of said data.

7. A receiving buffer control system as claimed in claim 6, wherein:

said write pointer means comprises a plurality of write pointers respectively provided for said buffer areas;

said read pointer means comprises a plurality of read pointers respectively provided for said buffer areas;

said overrun/underrun, detection means detects, for each of said buffer areas, said situation; and said control means disables, for each of said buffer areas, the data from being written into and read out from the buffer area when said overrun/underrun detection means detects said situation.

8. A receiving buffer control system as claimed in claim 7, further comprising means for selecting one of the write pointers and one of the read pointers on the basis of the type of said data.

9. A receiving buffer control system, comprising:

a memory having a buffer area serving as a receiving buffer, data being applied to said memory via a bus;

write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation;

updating means for updating the read address based on an advanced read address;

cache memory, coupled to said memory, into which data identical to the data written into said buffer area is written; and means, operatively coupled to said updating means, for invalidating the data in the cache memory when said advanced read address is output.

10. A receiving buffer control system, comprising:

a memory having a buffer area serving as a receiving buffer, data being applied to said memory via a bus;

write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation; and updating means for storing an advanced read address in a register, said advanced read address preceding said read address by a predetermined address value said read address being indicated by said read pointer means and, for updating said read address indicated by said read pointer means with said advanced read address.

11. A receiving ring buffer control mechanism in a parallel computer system in which a plurality of processors are connected to each other via a network, each processor comprising:

a main memory having a buffer area serving as a receiving buffer, data being applied to said main memory via a bus;

a write pointer, coupled to said main memory, for indicating a write address of the buffer area;

a read pointer, coupled to said main memory, for indicating a read address of the buffer area;

an overrun/underrun detector, coupled to said write pointer and said read pointer, for detecting a situation in which an overrun or an underrun will occur in the buffer area in response to the write address indicated by said write pointer and said read address indicated by said read pointer;

a single DMA controller, coupled to said main memory and said overrun/underrun detector, for preventing the data from being written into and read out from the buffer area when said overrun/underrun detector detects said situation; and an updating unit for storing an advanced read address which precedes said read address by a predetermined address value, said read address being indicated by said read pointer, and for updating said read address indicated by said read pointer with said advanced read address.

12. A receiving ring buffer control mechanism as claimed in claim 11, further comprising a second unit for writing an external read address into said read pointer, said external read address indicating whether said data has been split and written into more than one portion of a plurality of portions in the buffer area, so that said split data can be continuously read out from the buffer area.

13. A receiving buffer control system, comprising:

a memory having a buffer area serving as a receiving buffer, data being applied to said memory via a bus;

write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation;

updating means for storing an advanced read address which precedes said read address by a predetermined address value said read address being indicated by said read pointer means and, for updating said read address indicated by said read pointer means with said advanced read address;

register means for holding a first base address representing a logical address and a second base address representing a real address; and a selected one of said first base address and said second base address is used, based on an access mode corresponding to said data input to the buffer area, for updating the write address indicated by the write pointer means and the read address indicated by the read pointer means.

14. A receiving buffer control system, comprising:

a memory having a buffer area serving as a receiving buffer, data being applied to said memory via a bus;

write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation;

updating means for storing an advanced read address which precedes said read address by a predetermined address value said read address being indicated by said read pointer means and, for updating said read address indicated by said read pointer means with said advanced read address;

each data is one type of a plurality of types;

said memory comprises a plurality of buffer areas; and said receiving buffer control system comprises means for detecting which type of the plurality of types said data is and for selecting one of the plurality of buffer areas on the basis of the type of said data.

15. A receiving buffer control system as claimed in claim 14, wherein:

said write pointer means comprises a plurality of write pointers respectively provided for said buffer areas;

said read pointer means comprises a plurality of read pointers respectively provided for said buffer areas;

said overrun/underrun detection means detects, for each of said buffer areas, said situation; and said control means disables, for each of said buffer areas, the data from being written into and read out from the buffer area when said overrun/underrun detecting means detects said situation.

16. A receiving buffer control system as claimed in claim 14, further comprising means for selecting one of the write pointers and one of the read pointers on the basis of the type of said data.

17. A receiving buffer control system, comprising:

a memory having a buffer area serving as a receiving buffer, data being applied to said memory via a bus;

write pointer means, coupled to said memory, for indicating a write address of the buffer area;

read pointer means, coupled to said memory, for indicating a read address of the buffer area;

overrun/underrun detection means, coupled to said write pointer means and said read pointer means, for detecting a situation in which an overrun or an underrun will occur in the buffer area in response to the write address indicated by said write pointer means and said read address indicated by said read pointer means;

control means, coupled to said memory and said overrun/underrun detection means, for preventing the data from being written into and read out from the buffer area when said overrun/underrun detection means detects said situation;

updating means for storing an advanced read address which precedes said read address by a predetermined address value said read address being indicated by said read pointer means and, for updating said read address indicated by said read pointer means with said advanced read address;

cache memory, coupled to said memory, into which data identical to the data written into said buffer area is written; and means, operatively coupled to said updating means, for invalidating the data in the cache memory when said advanced read address is output.

* * * * *

UNITED STATES PATENT AND TRADEMARK OFFICE
CERTIFICATE OF CORRECTION

PATENT NO. : 5,765,187
DATED : June 9, 1998
INVENTOR(S) : Toshiyuki SHIMIZU et al.

It is certified that error appears in the above-identified patent and that said Letters Patent is hereby corrected as shown below:

Col. 1, line 45, after "Fig. 1" insert --.--.

Col. 2, line 25, change "60-78570" to --60-178570--.

Col. 3, line 28, change "use" to --used--;
line 44, after "Fig. 1" insert --.--;
line 55, change "17" to --11--.

Col. 4, line 35, delete "t";
line 36, change "he" to --the--.

Col. 5, line 53, change "sign" to --signal--;
line 60, change "predetermine" to --predetermined--.

Col. 7, line 25, delete "the" (first occurrence).

Col. 8, line 21, change "PDPP" to --RDPP--;
line 59, change "1" to --10--.

Col. 9, line 14, after "27" insert --,--;
line 37, after "data" (first occurrence) insert --C--;
line 55, change "PDPP" to --RDPP--.

Signed and Sealed this

Sixth Day of October, 1998

*Attest:*

BRUCE LEHMAN

*Attesting Officer*     *Commissioner of Patents and Trademarks*